United States Patent
Bittner, Jr.

(10) Patent No.: US 7,260,732 B1
(45) Date of Patent: Aug. 21, 2007

(54) POWER REGULATION SYSTEM AND METHOD FOR A PORTABLE ELECTRONIC DEVICE

(75) Inventor: Ray A. Bittner, Jr., Cumberland, MD (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 10/900,770

(22) Filed: Jul. 28, 2004

(51) Int. Cl.
G06F 1/26 (2006.01)
G06F 1/28 (2006.01)
G06F 1/32 (2006.01)

(52) U.S. Cl. ............ 713/324; 713/300; 713/320; 713/322; 713/323

(58) Field of Classification Search ........ 713/323, 713/324
See application file for complete search history.

(56) References Cited

U.S. PATENT DOCUMENTS

| | | | | |
|---|---|---|---|---|
| 5,525,895 A | * | 6/1996 | Fishman | 323/268 |
| 5,731,731 A | | 3/1998 | Wilcox et al. | 327/403 |
| 5,784,627 A | | 7/1998 | MacDonald | 395/750.01 |
| 5,842,037 A | * | 11/1998 | Haartsen | 710/1 |
| 5,925,134 A | | 7/1999 | Solomon | 713/324 |
| 6,150,798 A | * | 11/2000 | Ferry et al. | 323/273 |
| 6,304,517 B1 | * | 10/2001 | Ledfelt et al. | 368/10 |
| 6,396,137 B1 | | 5/2002 | Klughart | 257/691 |
| 6,661,210 B2 | | 12/2003 | Kimball et al. | 323/268 |
| 2003/0009772 A1 | * | 1/2003 | Karr | 725/142 |
| 2003/0227281 A1 | | 12/2003 | Nguyen | 323/282 |

OTHER PUBLICATIONS

Faas, Dennis."Processor History". infopackets windows newsletter, [online], [retrieved on Jan. 1, 1996]. Retrieved from Internet:<URL: http://www.infopackets.com/channels/en/windows/gazette/2001/20011201_processor_history.htm>.*
Bittner, Ray, "Dick Tracey & Beyond: SPO Hardware Design (Smart Personal Objects)", www.microsoft.com/spot, Oct. 22, 2003.

* cited by examiner

Primary Examiner—James K Trujillo
(74) Attorney, Agent, or Firm—Brett A. Hertzberg; Merchant & Gould (57) ABSTRACT

A power regulating system and method are provided for regulating power in a portable computing device. The portable computing device includes microprocessing and radio communication capabilities. The power regulating system utilizes a number of power states to regulate the device's internal power source voltage. The power regulating system operates to selectively control and regulate the device's internal power consumption based on the power state of the device, and thereby extends the useful life of the device by prolonging the battery life of the device.

23 Claims, 9 Drawing Sheets

POWER REGULATION SYSTEM AND METHOD FOR A PORTABLE ELECTRONIC DEVICE

FIELD OF THE INVENTION

The present invention relates generally to portable electronic devices. More particularly, the present invention relates to a system and method for regulating internal power consumption of a portable electronic device.

BACKGROUND OF THE INVENTION

As society becomes increasingly mobile, mobile electronic devices are enjoying a tidal wave of popularity and growth. Cell phones, wireless PDAs, wireless laptops and other mobile communication devices are making impressive inroads with mainstream customers. Constraining this growth and limiting customer satisfaction, however, is the lack of a truly adequate high-coverage-area, inexpensive, small, battery-efficient wireless communication system. Cellular data-transmit telephony-based solutions are far from power-efficient, and impose (relative) cost and size burdens that make them unusable.

Many of these mobile electronic devices operate using an internal power source. The internal power source, generally a lithium-ion battery, provides power to the associated device. Unfortunately, due to various limitations, the power source has a limited lifetime which can adversely affect a user's experience using the device. Due to the size constraints of the mobile electronic device, it is difficult to provide a power source having a preferred capacity and an extended useful lifetime.

Furthermore, in addition to a limited power resource, since many mobile electronic devices rely on radio transmissions, it is important to manage the amount of internal noise generated by each device, otherwise the radio signal reception may be corrupt or null. Many radio receivers manage this problem by using Faraday cages, or by careful frequency planning that guarantees that there will be no interference between the on board electronics and the radio receiver. However, in some devices, the received radio frequencies are very close to the operating frequencies of the on-board electronics, so that it is not possible to alleviate the problem with frequency planning. Nor is a Faraday cage desirable due to the limited space available inside a typical mobile electronic device.

SUMMARY OF THE INVENTION

In a battery-powered, portable computer, such as a watch device, a system is provided for controlling power consumption so that the device may operate on a single charge for an extended length of time. The device power regulating system includes a plurality of power states, and mechanisms for switching between these states. In one embodiment of the invention, a switching regulator efficiently converts voltage when radio operability is not desired. When radio operability is desired, one or more linear regulators quietly convert voltage. The system operates to extend the battery life of the device, without sacrificing radio operability.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

The present invention is described in the context of wireless client devices, such as personal data assistants (PDAs), cellphones, pagers, smart phones, camera phones, etc. The present invention provides a power regulating system for an electronic device. In various described embodiments, the electronic devices may be smart mobile devices, such as watch type devices, that are specially configured to receive and/or transmit communication signals. As will become apparent from a reading of the following detailed description, an electronic device may be configured to receive and process information, while the device's power regulating system monitors and controls the amount of power used by the device. By actively regulating the device's power usage, the battery's useful life may be extended, thereby extending the useful life of the electronic device. By extending the useful life of the electronic device, consumers may be more inclined to purchase such a device and make recommendations to others based upon the device's desirable power consumption characteristics. As described in detail below, the electronic device, its associated power regulating system and method of operation are provided to regulate the device's power consumption and thereby prolong the useful life of the device.

Although described here in the context of a watch-based system, it will be apparent that the teachings of the application have equal applicability to other mobile devices, such as portable computers, personal digital assistants (PDAs), cellular telephones, alarm clocks, key-chains, refrigerator magnets, and the like. The use of a watch is for illustrative purposes only to simplify the following discussion, and may be used interchangeably with "mobile device", and/or "client device".

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

The overall operating environment for the present invention will be discussed as follows below with reference to FIGS. 1-2.

Operating Environment

Figure 1:
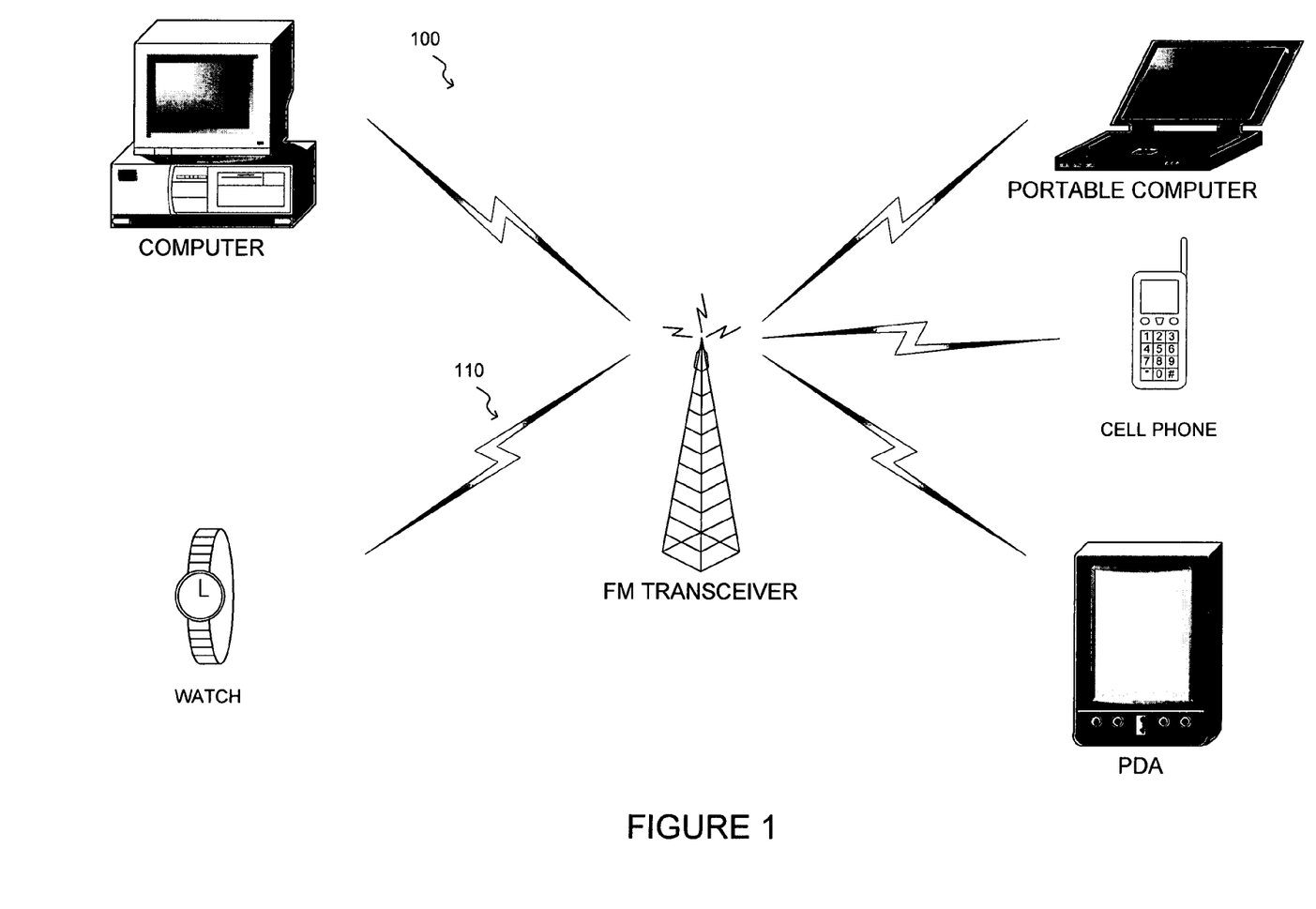
FIG. 1 is a diagram illustrating an operating environment.

FIG. 1 illustrates an example operating environment 100 for the present invention. As illustrated in the figure, an FM broadcast is transmitted over a communication channel 110 to various electronic devices. Example electronic devices that have an FM receiver or transceiver may include a desktop computer, a watch, a portable computer, a wireless cellular telephone (cell phone), and/or a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

Example electronic devices that may include an electronic system that is arranged to operate according to the interaction model are illustrated in FIG. 1. The electronic system may employ a wireless interface such as the FM transmission systems that are described above. Each of the electronic systems receives messages/information over the communication channel.

Illustrative Electronic System

Figure 2:
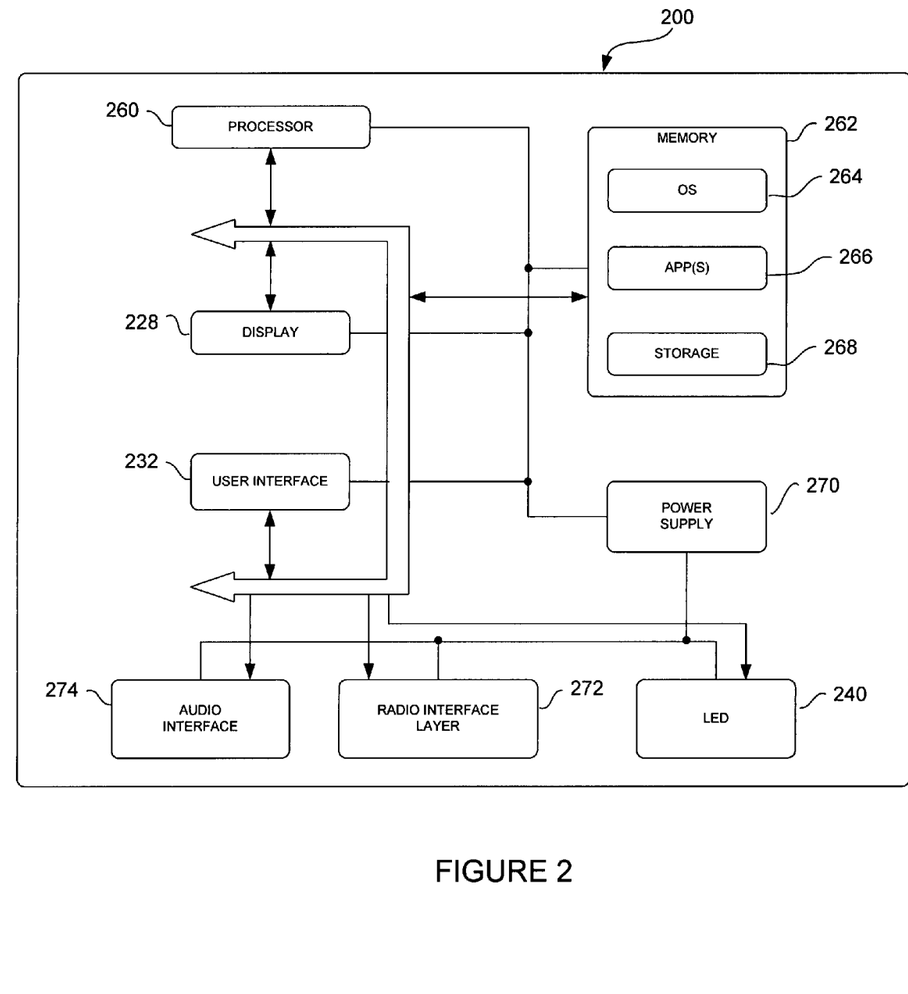
FIG. 2 is a schematic diagram illustrating an electronic device.

FIG. 2 is a schematic diagram illustrating functional components of an illustrative electronic device 200. The electronic device 200 has a processor 260, a memory 262, a display 228, and a user interface 232. The memory 262 generally includes both volatile memory (e.g., RAM) and non-volatile memory (e.g., ROM, Flash Memory, or the like). The electronic device 200 includes an operating system 264, such as the Windows CE operating system from Microsoft Corporation or another operating system, which is resident in the memory 262 and executes on the processor 260. The user interface 232 may be a series of push buttons, a scroll wheel, a numeric dialing pad (such as on a typical telephone), or another type of user interface means. The display 228 may be a liquid crystal display, a multiple bit display, or a full color display or any other type of display commonly used in electronic devices. In one example, the display 228 may be touch-sensitive that would act as an input device.

One or more application programs 266 are loaded into memory 262 and run on the operating system 264. Examples of application programs include phone dialer programs, email programs, scheduling/calendaring programs, PIM (personal information management) programs, Internet browser programs, and so forth. The electronic device 200 also includes a non-volatile storage 268 that is located within the memory 262. The non-volatile storage 268 may be used to store persistent information which should not be lost if the electronic device 200 is powered down. The applications 266 may use and store information in the storage 268, such as e-mail or other messages used by an e-mail application, contact information used by a PIM, appointment information used by a scheduling program, documents used by a word processing application, and the like.

The electronic device 200 has a power supply 270, which may be implemented as one or more batteries. The power supply 270 might further include an external power source, such as an AC adapter or a powered docking cradle that supplements or recharges the batteries.

The electronic device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived message. The electronic device 200 can control each alert mechanism separately (e.g., audio, vibration, as well as visual cues).

The electronic device 200 also includes a radio interface layer 272 that performs the function of receiving and/or transmitting radio frequency communications. The radio interface layer 272 facilitates wireless connectivity between the electronic device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Figure 3A:
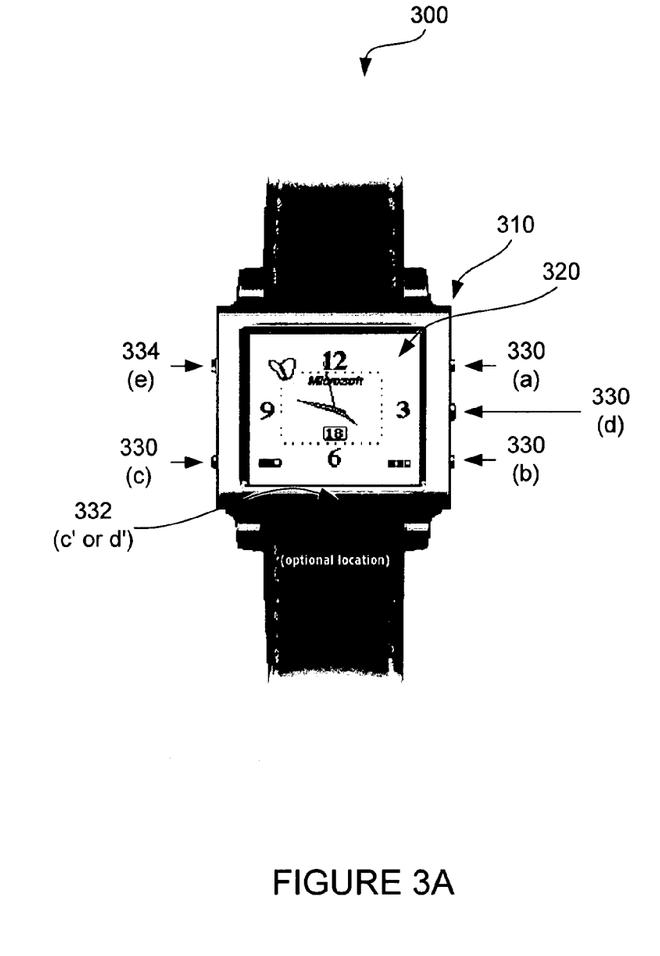
FIGS. 3A-3B are diagrams illustrating watch devices that include a user interface.
Figure 3B:
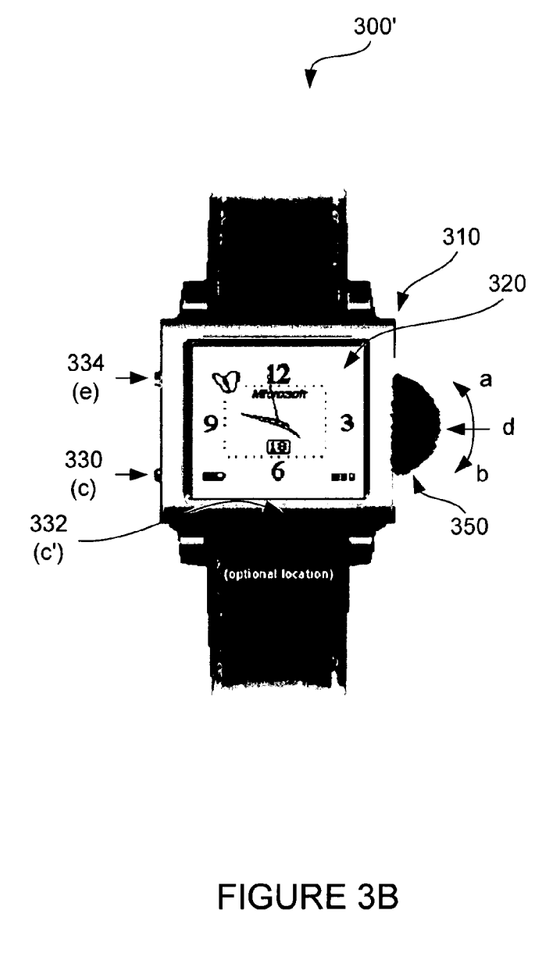

In one example of the present invention, electronic device 200 is a mobile electronic device such as a watch device that includes a wireless interface. Exemplary user interfaces for a watch device are shown in FIGS. 3A and 3B, as will be described below. Although the below-described user interface configurations include multiple selector buttons (e.g., four selector buttons), the functions of many of the selector buttons may be combined by a single selector (e.g., a button, a rocker switch, a wheel, etc.).

User Interfaces (UI)

FIG. 3A illustrates an exemplary watch device 300 that includes a user interface that is configured to take advantage of glanceable information technology. The watch device 300 includes a bezel 310, which has an electronic system (e.g., see FIG. 2). The electronic system performs the functions in a manner that is consistent with the hardware that was previously described with respect to FIG. 2. The bezel 310 has a display 320 such as a liquid crystal display, a multiple bit display, or a full color display. In one embodiment, watch hands are electronically generated on the display 320. In an alternative embodiment, the bezel includes analog-type watch hands that do not detrimentally interfere with the display 320. The watch device 300 includes a series of buttons 330 that are arranged to operate as a user interface (UI).

Each of the buttons operates as a selector in the user interface. Every button has a default function, and/or a context determined function. The currently selected channel determines the context for each selector. Alternatively, the currently active display may determine the context for each selector. For example, a display screen (e.g., a help screen) may be superimposed on the main display such that the display screen becomes the active context. The electronic device 300 is context sensitive in that the function that is associated with each selector may change based on the selected channel or display screen.

A first one of the selectors, button "a" 330 has a default function of page up or previous page in the currently selected channel. The first selector, button "a" 330, also has an alternate function based on currently selected channel or display. For example, when a help screen is displayed, the first selector may be configured to select a list display mode. In the list display mode, the electronic device will display a list of available messages or content that is associated with a particular channel. The time channel may include a main time screen, a chronograph screen, an alarm screen, and a timer screen. When the currently selected channel is the time channel, the first selector may be activated to set the time, start the chronograph, set the timer, or set the alarm on the electronic device. The setting of the time/timer/alarm is accomplished by activating the first selector for a predetermined time period. For example, when the selector is a button as shown in FIG. 3A, the button is held for a timeout interval such as two seconds before the setting function is activated.

A second one for the selectors, button "b" 330 has a default function of page down or next page in the currently selected channel. The second selector, button "b" 330, may also have an alternate function based on currently selected channel or display. In one example, the second selector is activated for a predetermined time interval (e.g., two seconds) to select "delete" function in a particular channel. In another example, the second selector is activated for a predetermined time interval to select a "list browse" function in a particular channel. In one example, activation of the second selector for two seconds selects the list browse function such that a pop-up visual cue (e.g., a pop-up window) indicates how that list is indexed. Each record set can be indexed by things such as dates, numbers, categories, or any other way of indexing a record set. The list browse indexing allows a user to quickly access records located within the list.

A third one of the selectors, button "c" 330 has a default function of next channel. The third selector, button "c" 330, may also have an alternate function based on the currently selected channel or display. In one example, the third selector is activated for a predetermined time interval (e.g., two seconds) to select the main channel or "primary" channel. The main channel in a watch device is the time screen, but may be a different screen in another device.

A fourth one of the selectors, button "d" 330 has a default (or "primary") function of "enter". The "enter" function is context sensitive and used to select the "enter" function within a selected channel, or to select an item from a selection list. The fourth selector, button "d" 330, may also have an alternate function based on the currently selected channel or display. For example, the fourth selector is activated for a predetermined time interval (e.g., two seconds) to activate a help screen or an additional set mode. In this example, the help screen remains active while the fourth selector is activated (e.g., maintaining button "d" as depressed), and the help screen is deactivated (e.g., removed from the display) when the fourth selector is deactivated (e.g., by releasing button "d").

The four selectors are arranged such that the electronic device accomplishes navigating and selecting content on each channel in a simple manner. An optional fifth selector (e.g., button "e", 334) may be arranged to provide other functions such as backlighting or another desired function. An optional sixth selector (e.g., button "f") may be arranged to operate as a "channel back" function such that navigation through channels may be accomplished in a forward and reverse direction.

In an alternative example, the third selector (e.g., button "c") may be located in the bottom center region of the watch bezel as illustrated by selector 332. In yet another example, the fourth selector (e.g., button "d") is located in the bottom center region of the watch bezel as illustrated by selector 332.

FIG. 3B illustrates another exemplary watch device 300' that includes a user interface to an electronic system that is configured to operate in accordance with the present invention. The watch device 300 is arranged in a substantially similar manner as that discussed with respect to FIG. 3A. However, the first, second, and third selectors (e.g., buttons "a", "b", and "d") are replaced with a wheel type of device 350. The functions of the "a" and "b" selectors are activated by rotating the wheel device 350 in a counterclockwise and clockwise manner. The functions of the "d" selector are activated by pressing the wheel device 350 towards the watch bezel.

In an alternative example, the "a" and "b" button-type selectors are replaced by a rocker-type of switch that may be depressed toward the locations of the "a" and "b" selectors illustrated in FIGS. 3A and 3B. In still another example, a touch screen interface is employed as the selectors for the watch device. Other examples of selector mechanisms may be employed.

Every electronic device has a set of selectors (or buttons) that are selectively activated to navigate various functions in the device. Example selectors are illustrated in FIGS. 3A-3B. For the purposes of the discussion below, each selector is indicated by a letter such as "a", "b", "c", "d", and "e". Some alternate selector functions may be chosen by sustained activation of a selector button for a predetermined time interval (e.g., two seconds). These alternate selector functions are generally indicated by a "+" symbol adjacent to the selector functions' designating letter (e.g., "c+").

The example electronic device described below includes at least four selectors as indicated by letters "a", "b", "c", and "d". The "e" selector may be arranged to provide additional functions such as backlighting, a back channel selector, as well as any other desired function. Additional extended functions may also be accessible through multiple selector combinations. For example, holding the "d" and "a" selectors together ("d+" & "a+") for a predetermined time interval can be done to select special settings in the electronic device such as a "screen adjust" function. Additional extended functions can also be accomplished using other selector combinations such as "d+" & "b+", "a+" & "b+", as well as others.

Power Regulation System for a Mobile Electronic Device

According to the present invention, a power system and method regulates the power of a mobile electronic device, such as a watch device. A watch device, such as the devices shown in FIGS. 3A and 3B, is typically an extremely low power computer system. Due to the size constraints of such a device, the battery (or batteries) providing power to the device have limited capacity. Thus, it is extremely important to prolong the useful life of the battery; otherwise, consumers may be dissuaded from purchasing such a device, due to the potentially short operational duration of the device. The present invention provides a power regulation system and method that tends to prolong the useful life of the battery (or batteries) of the device, as described in detail below.

The following discussion relates to a power regulation system and method for watch devices and similar electronic systems. However, it will be appreciated that the present invention is not limited to watch devices, and those skilled in the art will realize the benefits of the present invention for other mobile electronic devices.

Figure 4A:
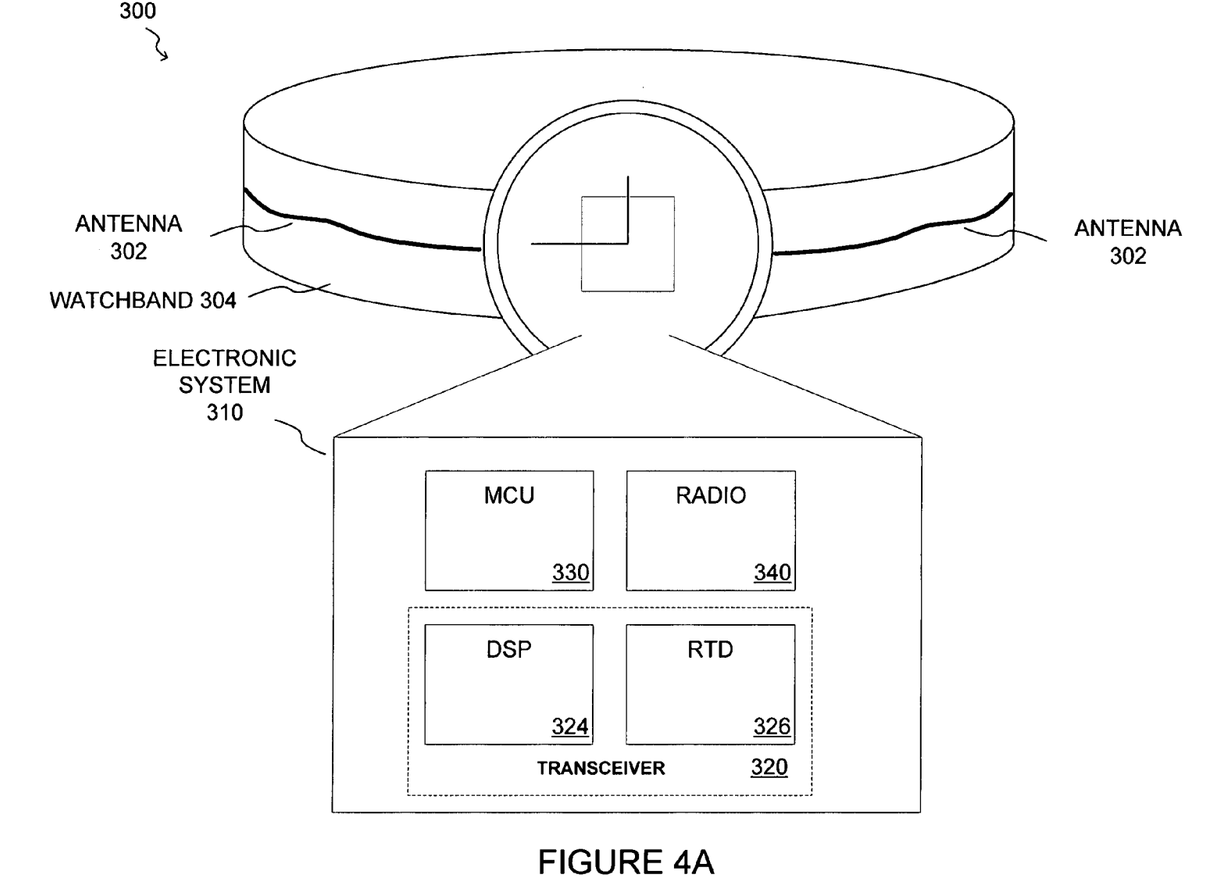
FIG. 4A is a diagram illustrating another watch device and related components.

In addition to those described above, yet another exemplary watch device 420 is shown in FIG. 4A. The watch device 420 includes an electronic system 422 that is configured to operate in accordance with the present invention. The watch device 420 includes a watchband 424 that includes an antenna 426 that is either attached to the watchband or integrally formed within the watchband 424. The antenna 426 is coupled to the electronic system 422 that is contained in the watch. The electronic system 422 may be contained in the bezel as shown in FIG. 4A, or in some other portion of the watch device.

The electronic system 422 is a computer-based system, including functionality of operating as either a receiver and/or transceiver type of device. As illustrated in the figure, the electronic system includes a transceiver 428, a microcomputer unit or microprocessor 430, and an analog radio 432. The antenna connects to, and is controlled by, the transceiver 428. Transactions between the microprocessor 430 and the radio components are mediated over a microprocessor-digital transceiver interface. The components of the watch device 420 are housed in a watch-sized enclosure and rely on battery power for operation.

The transceiver 428 generally includes a digital signal processor (DSP 434, which performs control, scheduling, and post-processing tasks for the transceiver, and a real-time device (RTD) 436, which includes a digital radio, system timing, and real-time event dispatching. The DSP 434 is coupled to the microprocessor 430, and transceiver tasks are commanded by the microprocessor 430.

One of the DSP's tasks may process received data for such purposes as sub-carrier phase recovery, baud recovery and/or tracking, compensation for fading effects, demodulation, de-interleaving, channel state estimation and error-correction. The post-processing of packets may occur when an entire packet has been received, or another subsequent time. The DSP 434 analyzes the transmitted data packets to determine a broadcast station's signal timing with respect to the local clock (SLOWCLK defined below) of the RTD 436. The local clock is synchronized with the transmitter's clock signal to maintain signal sampling integrity. The receiver is periodically brought into symbol synchronization with the transmitter to minimize misreading of the received data.

The digital section of the RTD 436 may include system time-base generators (described below), such as a crystal oscillator that provides the system clock (SYSCLK defined below) for the microprocessor 430 and the DSP 434. The time-base also provides baud and sample timing for transmit and receive operations, start/stop control for radio operation, and controls the periods of clock suspension to the microprocessor 430 and the DSP 434. The RTD 436 also performs radio operations, and may perform additional operations as well. The radio 432 is arranged to receive segments of data that is arranged in packets.

The operating environment shown and described are only examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Figure 4B:
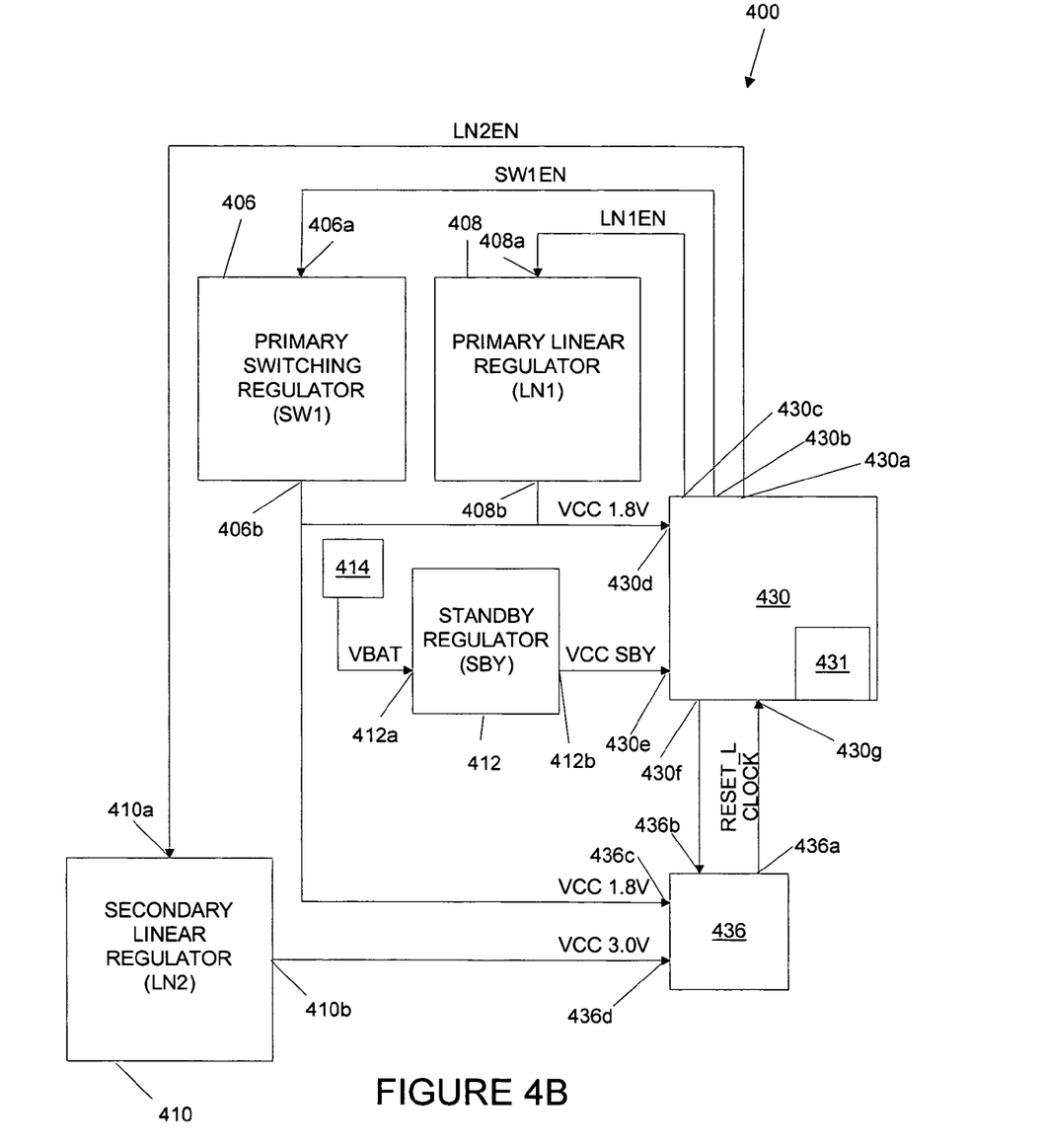
FIG. 4B is a functional block diagram of a power regulation system according to an embodiment of the invention.

Referring now to FIG. 4B, a functional block diagram of a power regulation system 400 shown for a watch device such as the watch device 420 depicted in FIG. 4A. The power regulation system 400 utilizes software applications stored in memory that operate to assist in the power regulating functionality of the power regulating system 400. FIG. 4B also depicts the microprocessor 430, and RTD 436 as part of the power regulation system 400. For example, the microprocessor 430 may be an ARM7TDMI 32-bit processor core, capable of running at about 27.6 MHz. The watch device 420 may also include 512K of ROM, 384K of RAM, and external Flash. The display (see FIG. 2) may be a liquid crystal display (LCD) operable to display relevant information received by the radio layer from an FM sub-carrier signal. The content of the watch is programmable and may be updated on the fly from the FM sub-carrier signal.

In one embodiment, the power regulation system 400 also includes a primary switching regulator 406, primary linear regulator 408, secondary linear regulator 410, and a standby regulator 412. As described above, the power regulation system utilizes one or more software applications residing in memory, along with microprocessor control and radio interactivity. The microprocessor 430 includes a power control unit 431 which may provide power ON, power OFF, and reset controls for the system. The power control unit 431 may be described as a predominantly asynchronous state machine that receives inputs (information) from the buttons, software, and internal voltage level detectors. For this embodiment, the power control unit 431 uses the gathered information in transitioning between various power states.

The regulators described herein may be formed as integrated circuits or chips. The primary switching regulator 406 may be fabricated to have an input voltage of about 3V to about 4.2V, output voltage of about 1.8V, and an output current of about 0 mA to about 30 mA. The primary linear regulator 408 may be fabricated to have an input voltage of about 3V to about 4.2V, output voltage of about 1.8V, and an output current of about 0 mA to about 2 mA. The secondary linear regulator 410 may be fabricated to have an input voltage of about 3.2V to about 4.2V, output voltage of about 3V, and an output current of about 0 mA to about 30 mA. The standby regulator 412 may be fabricated to have an input voltage of about 3V to about 4.2V, output voltage of about 2.8V, and an output current of about 1 mA. As shown in FIG.

4B, microprocessor pins 430*a*-430*g* are electrically connected to the regulators and the RTD 436. The pins (I/O structure) provide voltage detection points for use in regulating power states of the watch device at select times.

Microprocessor pin 430*a* electrically connects to the input 410*a* of the secondary linear regulator 410. Microprocessor pin 430*b* electrically connects to the input 406*a* of the primary switching regulator 406. Microprocessor pin 430*c* electrically connects to the input 408*a* of the primary linear regulator 408. Microprocessor pin 430*d* electrically connects to the output 406*b* of the primary switching regulator 406 and the output 408*b* of the primary linear regulator 408. Microprocessor pin 430*e* electrically connects to the output 412*b* of the standby regulator 412. Microprocessor pin 430*f* electrically connects to an input 436*a* of the RTD 436. Microprocessor pin 430*g* electrically connects to the output 436*b* of the RTD 436. With continuing reference to FIG. 4B, the output 406*b* of the primary switching regulator 406 also electrically connects to an input 436*c* of the RTD 436. The output 410*b* of the secondary linear regulator 410 electrically connects to another input 436*d* of the RTD 436. The power source, such as battery 414, electrically connects to the input 412*a* of the standby regulator 412. The standby regulator 412 is preferably a linear regulator and regulates power provided to the microprocessor 430 and associated power control unit 431.

According to the invention, it is desirable to keep the power consumption of the watch device at a low enough level to maintain a useful if not prolonged battery life, while also maintaining an acceptable level of radio receptivity. Typically, the battery 414 has a capacity of about 150 mAH (milliamp-hours) with a nominal output of about 3.6V. It has been determined that, when running at full speed, the microprocessor 430 consumes approximately 57.6 mW of power, which would drain the battery in about 9.3 hours. In fact, the average power consumption of the watch is about 3 mW to about 8 mW depending on the operating mode, for a total active battery life of about 67.5 hours to about 180 hours. The battery life may be extended by careful use of various low power states, as described below.

As described above, the power regulation system 400 operates to maintain the watch device's battery life, while also operating to provide an acceptable level of radio reception. The watch device 420, along with software applications and microprocessing, utilizes both switching and linear regulators to obtain desired power consumption and radio reception characteristics. As known to those skilled in the art, a switching regulator is normally more efficient at power conversion than the linear regulator; whereas a linear regulator normally includes lower noise generating characteristics than a switching regulator. Thus, during times of radio operation, the switching regulator may interfere with the radio functionality, since the switching regulator has a tendency to generate a substantial amount of radio noise during times of power conversion. Thus, the invention utilizes the primary switching regulator 406 during times when radio reception is not required and one or more linear regulators during radio reception periods. These features, among others described herein, tend to prolong the useful battery life of the watch device.

When activated, the primary switching regulator 406 efficiently converts input voltages of about 3V to 4.2V, and provides an output voltage of about 1.8V to the microprocessor 430. As described above, during radio reception times, the watch device 420 transitions from using the primary switching regulator 406 to using a primary linear regulator 408 and a secondary linear regulator 410 for power conversion. When activated, the primary linear regulator 408 efficiently converts input voltages of about 3V to 4.2V, and provides an output voltage of about 1.8V to the microprocessor 430. The system tends to create minimal radio interference when using the primary linear regulator 408 to regulate the battery voltage during periods of radio reception. That is, during this stage, the invention utilizes one or more linear regulators having low noise characteristics at the expense of some battery life. Since radio reception typically occurs a very small percentage of the time, the overall power budget greatly benefits using this approach while still maintaining the low radio noise characteristics as needed.

Figure 5:
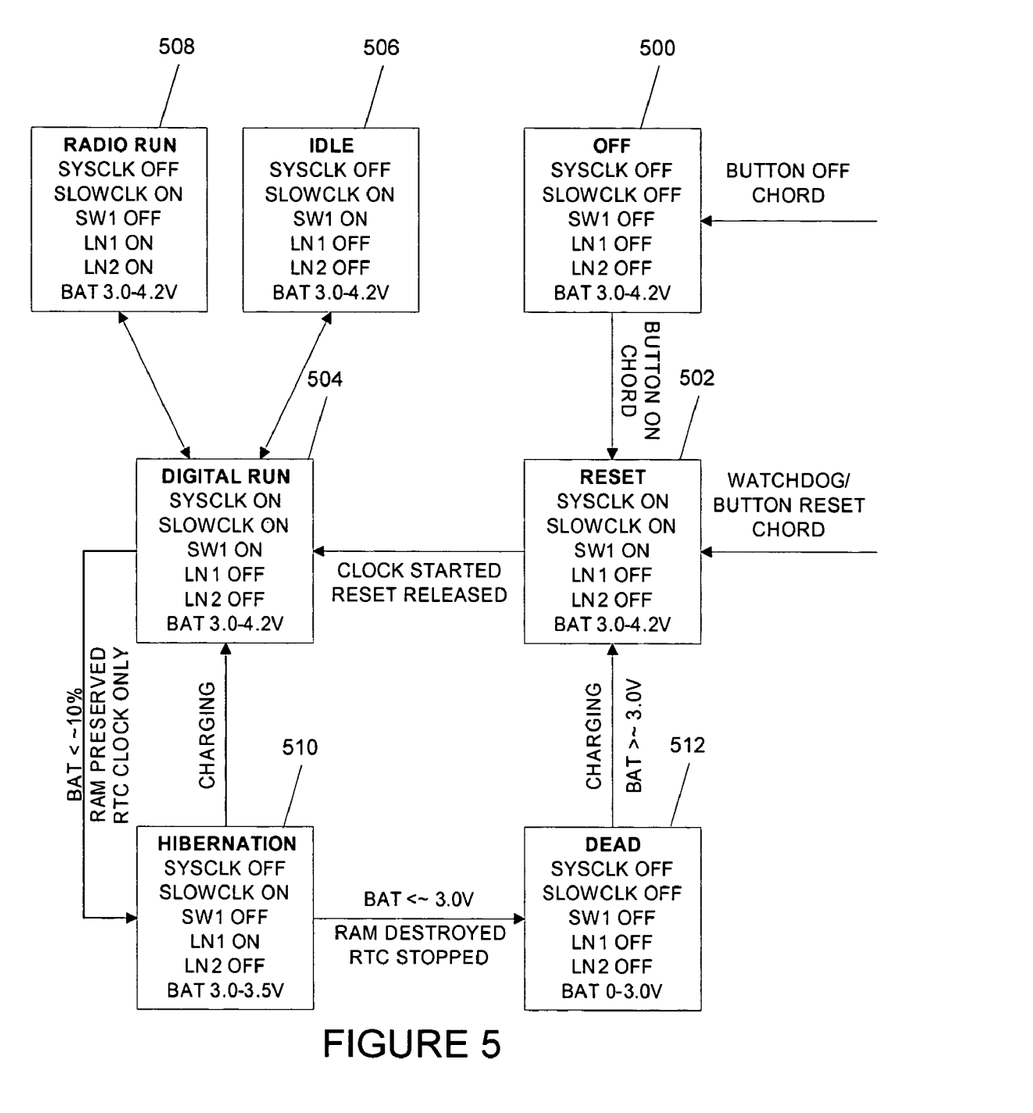
FIG. 5 is a process flow diagram for power state management of an electronic device; and, FIGS. 6A-6D are timing diagrams for power states of an electronic device according to an embodiment of the invention.

Referring now to FIG. 5, a functional block diagram depicts one embodiment of a power state transition scheme for efficient power regulation and minimized radio interference for the watch device 420. Each power state is shown in a rectangular block, with transitions between states depicted as arrows. Single-headed arrows correspond to one-way functionality, whereas two-headed arrows correspond to two-way functionality. For this embodiment, each block shows the operational state of various power regulation system components. Several device states are depicted: 1) radio run; 2) idle; 3) off; 4) digital run; 5) reset; 6) hibernation; and 7) dead.

FIG. 5 includes a number of acronyms which delineate specific watch device features. These acronyms include:

SYSCLK—A 27.6 MHz clock provided by the RTD 436 and normally used to drive the microprocessor 430. Due to SYSCLK's high frequency, this clock is not driven to the microprocessor 430 during radio reception periods to avoid causing radio interference with the device. Additionally, stopping SYSCLK allows the device to save a substantial amount of power, due in part to the dependent circuitry not being driven when SYSCLK is disabled (major contributor) and the actual wire on the printed circuit board not toggling.

SLOWCLK—A 25 kHz clock provided by the RTD 436 to drive the Real Time Clock (RTC) sections of the microprocessor 430. This very low frequency clock does not cause appreciable radio interference. Additionally, this clock consumes a negligible amount of power as compared to SYSCLK. Accordingly, SLOWCLK may be constantly running, providing a stable time reference for the device even though SYSCLK may be stopped and started many times.

SW1—The primary switching regulator 406. The primary switching regulator 406 provides about 1.8V to microprocessor 430 and RTD 436 during times when the radio is not receiving data. The primary switching regulator 406 is turned off during radio reception periods.

LN1—The primary linear regulator 408. The primary linear regulator 408 provides about 1.8V to the microprocessor 430 and RTD 436 preferably during radio reception periods. Since linear regulators have relatively poor power conversion efficiency while having very low radio noise emission characteristics, the primary linear regulator 408 is preferably turned on during radio reception periods, and turned off at all other times.

LN2—The secondary linear regulator 410. For this embodiment, a secondary linear regulator 410 provides higher voltages to certain sections of the radio front-end electronics. The secondary linear regulator 410 is preferably activated during radio reception, but may be turned off during other times. The secondary linear regulator 410 also has low radio noise emission characteristics.

BAT—Refers to the battery voltage. For this embodiment, a rechargeable lithium-ion battery 414 is used to power the watch device 420. The peak voltage of the battery 414 is about 4.2V. As those skilled in the art will appreciate, the voltage decreases as power is drained from the battery 414. By the time the battery voltage falls to about 3V, the majority of the lithium-ion battery power is drained. Thus, according to this embodiment, a limit of about 3V is used in some parts of the power transition scheme as a signal for transition to occur. Additionally, 3V is a minimum voltage for the secondary linear regulator 410 to provide a useful voltage to the radio front-end, which may be required for certain periods of operation.

For this embodiment, the power states referred to in FIG. 5 include:

IDLE—The watch device 420 should maintain the IDLE state for an appreciable period of time. For example, the IDLE state may be utilized at least about 95% of the time, thereby operating to preserve a desirable amount of battery. The microprocessor 430 is not processing in the IDLE state, however other devices are powered, including the display, such as a LCD. SYSCLK is disabled, but the RAM content is maintained. In one scenario, an interrupt may cause the watch device to transition from the IDLE state to DIGITAL RUN (described below). Such an interrupt may occur when a button is pressed or a timer expires, for example. SLOWCLK is running which drives the real-time clock (RTC). The IDLE state contributes to the extended battery life of the watch device since SYSCLK, a key power consumer, is stopped.

DIGITAL RUN—The microprocessor 430 performs various processing functions in this state. For this embodiment, no radio reception is occurring since the radio noise generated by the microprocessor 430 and the primary switching regulator 406 may drown a radio signal to the point where it would not be possible to receive any data. The primary switching regulator 406 is active to convert power with high conversion efficiency. The first and second linear regulators 408 and 410, respectively, are off since no radio reception is taking place.

RADIO RUN—A radio transmission and/or reception power state. SYSCLK is stopped, disabling the microprocessor. The first and second linear regulators 408 and 410, respectively, are on to reduce the potential for interference during radio reception and/or transmission. The secondary linear regulator 410 is activated to power the radio front-end electronics. SLOWCLK is kept running for time keeping purposes.

HIBERNATION—Represents a low power state, entered into when the battery 414 power drops to a dangerously low level. This differs from the IDLE state, since the display is now powered down. RAM content is maintained in the HIBERNATION state. SYSCLK is disabled; however, the SLOWCLK is still running allowing the RTC to maintain the time.

RESET—Used as an intermediate transition state in which reset is asserted, then SYSCLK is started and after a period of time reset is de-asserted. The RESET state is included as part of the power state transition hardware, but alternatively may be handled by an external circuit.

OFF—During the OFF state, no power is provided to any part of the device, with the exception of the power management system. The OFF state may be used as a factory delivered state so that the battery is not drained while in storage. The only way to transition out of this state is via a system reset as initiated by the user with the Button Reset Chord ("chord" refers to manipulating two or more buttons of the watch device) (see FIGS. 3A, 3B, and 5).

DEAD—In this state the battery has been totally depleted. Typically, when using a lithium-ion battery, the protection circuitry cuts off power usage when the battery reaches about 2.7 to about 2.8V. For this embodiment, transitioning to the DEAD state occurs when the battery 414 reaches about 3V. At 3V, almost all of the power has been drained from the battery and the DEAD state operates to relax some of the drop out voltage requirements on the regulators. Additionally, if the voltage drops below a 2.7 to 2.8V threshold, most lithium-ion batteries must be trickle charged. Trickle charging supplies only 1 to 5 mA of current to the battery and a reset of the system during such a time could conceivably consume all of the available current. Thus, the battery could be starved and unable to achieve a higher voltage level. By using a 3V threshold, it is safe to use greater charging currents and the aforementioned problem may be avoided.

Referring now to FIGS. 6A-6D, and with continuing reference to FIG. 5, a description of one power regulation state transition embodiment for the watch device is described. As described above, the power regulation system 400 uses the microprocessor 430, RTD 436, hardware and/or software applications to control transitions between the foregoing described states. Internal voltage level detectors in the power control unit 431 determine when a core voltage is present (about 1.8V for this embodiment). The watch device also includes an A/D converter as part of the RTD 436 that the software can use to measure the battery voltage directly.

Where possible, software controls the power state transitions using input signals, such as the battery power level and/or watch device mode(s), by manipulating the regulator enables directly. However, in some cases hardware controls the power regulation using similar inputs and the power control unit 431.

Some of hardware controlled power state transitions include transitions from:

The OFF state to the RESET state;
Watchdog/Button Reset Chord to the RESET state;
RESET state to the DIGITAL RUN state;
HIBERNATION state to the DEAD state; and,
DEAD state to the RESET state.

Some of software controlled state transitions include transitions from the:

DIGITAL RUN state to the RADIO RUN state;
DIGITAL RUN state to the IDLE state;
IDLE state to the DIGITAL RUN state (a hardware interrupt may begin this process);
RADIO RUN state to the DIGITAL RUN state (a hardware interrupt may begin this process);
DIGITAL RUN state to the HIBERNATION state; and,
HIBERNATION state to the DIGITAL RUN state.

The watch device controls the IDLE, DIGITAL RUN, RADIO RUN and HIBERNATION states using software to control the microprocessor's power control unit pins. The power control unit 431 may autonomously transition to and from the OFF and DEAD states. During the OFF and DEAD state periods, the power control unit 431 may be the only part of the watch device receiving power.

Figure 6A:
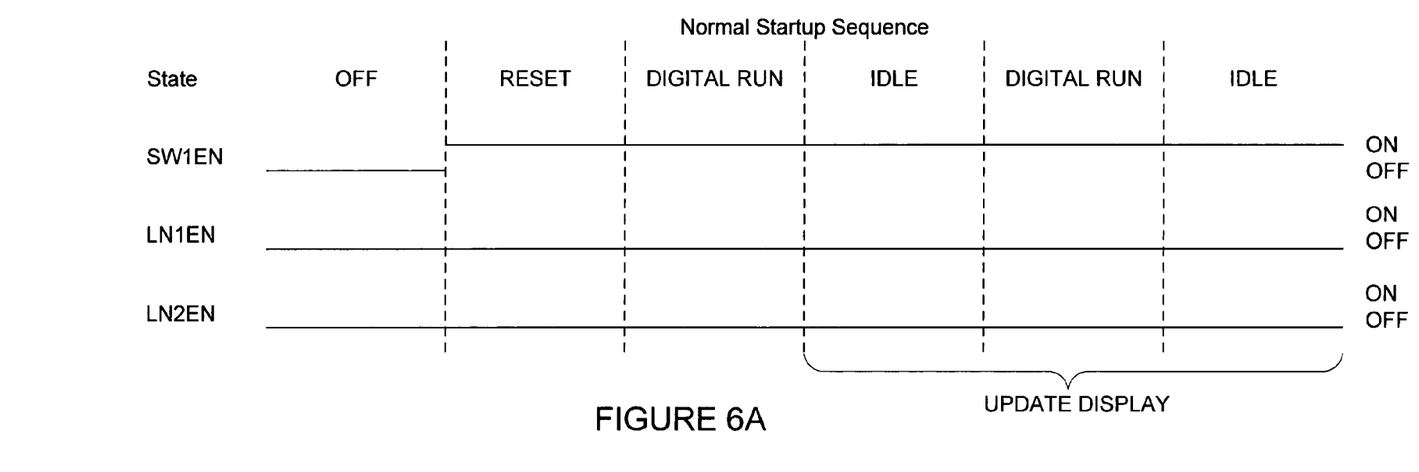

According to the embodiment shown in FIG. 6A, a normal startup sequence for the watch device 420 includes OFF, RESET, DIGITAL RUN, and IDLE states. In FIGS. 6A-6D, the horizontal axes correspond to increasing time. The vertical axes correspond to "on" (enabled) and "off" (disabled) device states for the primary switching regulator 406, primary linear regulator 408, and secondary linear regulator 410. The regulators are either "on" or "off," enabled by software and/or hardware control.

When the watch device 420 is powered up by pressing a predefined button or buttons, a normal startup sequence begins with a transition from the OFF state (block 500) to the RESET state (block 502). During the OFF state, the primary switching regulator 406, primary linear regulator 408, secondary linear regulator 410, SYSCLK, and SLOW-CLK are all "off." During the RESET state, the primary switching regulator 406, SYSCLK, and SLOWCLK are "on," while the primary and secondary linear regulators 408 and 410, respectively, are "off."

The startup sequence continues by transitioning from the RESET state (block 502) to the DIGITAL RUN state (block 504). During the DIGITAL RUN state, the primary switching regulator 406, SYSCLK, and SLOWCLK are "on," while the primary and secondary linear regulators 408 and 410, respectively, are "off." The watch device then transitions from the DIGITAL RUN state to the IDLE state (block 506). During the IDLE state, the primary switching regulator 406 and SLOWCLK are "on," while SYSCLK and the primary and secondary linear regulators 408 and 410, respectively, are "off." As stated above, the IDLE state is a major contributor to the overall power regulating features of the watch device.

As shown in FIGS. 5 and 6A, according to this embodiment, the normal transition path when updating the display includes a transition from the IDLE state (block 506) to the DIGITAL RUN state (block 504). During the IDLE state, the primary switching regulator 406 and SLOWCLK are "on," while SYSCLK and the primary and secondary linear regulators 408 and 410, respectively, are "off." During the DIGITAL RUN state, the primary switching regulator 406, SYSCLK, and SLOWCLK are "on," while the primary and secondary linear regulators 408 and 410, respectively, are "off." The display update concludes by transitioning from the DIGITAL RUN state (block 504) back to the IDLE state (block 506).

Figure 6B:
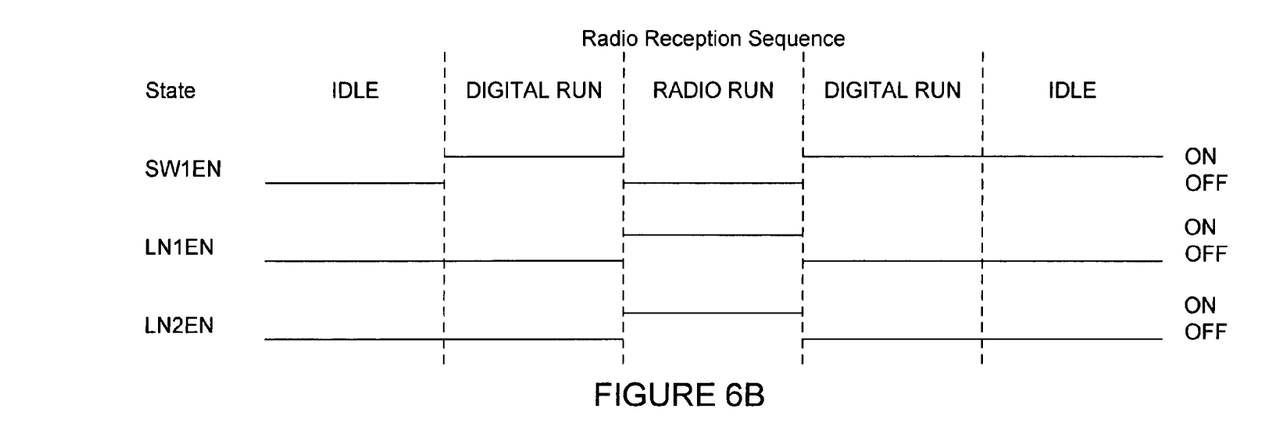

Referring now to FIG. 6B a radio reception sequence including related regulator states for the watch device 420 is shown. For this embodiment, the radio reception sequence begins with a transition from the IDLE state (block 506) to the DIGITAL RUN state (block 504). The IDLE and DIGITAL RUN regulator and clock states are described above. The watch device 420 continues with radio reception by transitioning from the DIGITAL RUN state (block 504) to the RADIO RUN state (block 508). During the RADIO RUN state, the primary switching regulator 406 and SYSCLK are "off," while SLOWCLK and the primary and secondary linear regulators 408 and 410, respectively, are "on." As described above, the primary switching regulator 406 and high frequency system clock are "off" during RADIO RUN since they may interfere with radio reception.

The radio reception sequence continues by transitioning from the RADIO RUN state (block 508) to the DIGITAL RUN state (block 504), and concludes the sequence by transitioning to the IDLE state (block 506). The radio reception sequence allows the microprocessor 430 to set capture timers and transition regulators before reception and then to transfer all received data after reception. Alternately, removing the DIGITAL RUN state preceding the RADIO RUN state in the radio reception sequence described above may shorten the radio reception sequence. That is, the abbreviated radio reception sequence may transition from the IDLE state (block 506) to the RADIO RUN state (block 508), then to the DIGITAL RUN state (block 504), and concluding with the IDLE state (block 506). The abbreviated radio reception sequence may be implemented by including more intelligence in the RTD 436, allowing the RTD 436 to partially control the regulators.

Figure 6C:
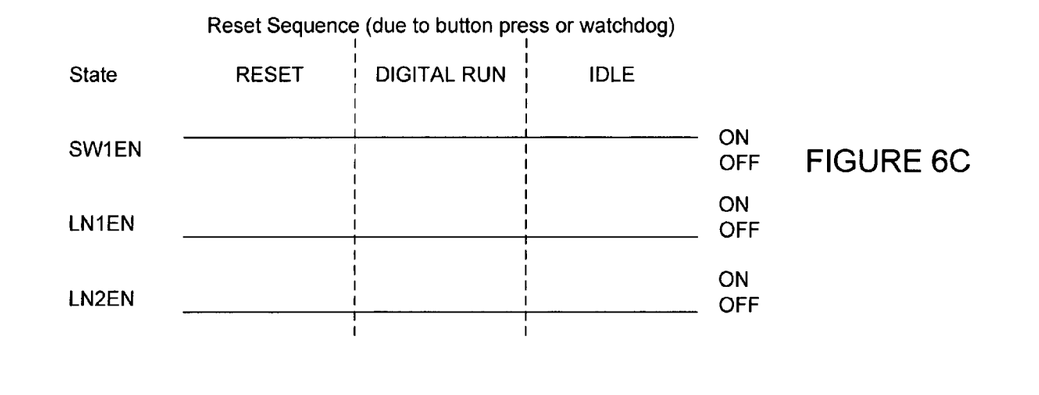

Referring now to FIG. 6C and with continuing reference to FIG. 5, a RESET sequence for the watch device 420 is shown. The RESET sequence may be activated when a user manipulates a plurality of watch buttons (chord) or from a watchdog event. It is preferred to use a plurality (at least two) of watch buttons (chord), to reduce inadvertent state transitions, such as when a single button is accidentally depressed. The power control unit 431 monitors chord activation. For this embodiment, the RESET sequence begins with a transition from the RESET state (block 502) to the DIGITAL RUN state (block 504), and concludes with a transition to the IDLE state (block 506). The RESET, IDLE, and DIGITAL RUN regulator and clock states are described above.

One potential RESET sequence may follow a watchdog event. A watchdog event is a potential watch failure mode that may occur due to a critical failure of either the hardware or software. Such a failure could occur due to a bug in the software, or from an electrostatic discharge, for example. A watchdog timer is included as part of the circuitry to help address these situations, but it is possible that the only way to have the watch recover from such a failure would be to perform a manual reset, much the same as on a typical PC. When the user simultaneously presses a plurality (e.g., three) of the watch buttons it will cause a system reset (RESET sequence) and restore the watch's functionality. Using a different combination of buttons, the user may also force the watch into the OFF state if they wish to preserve battery power for an extended period of time and do not require the watch's normal functionality.

Figure 6D:
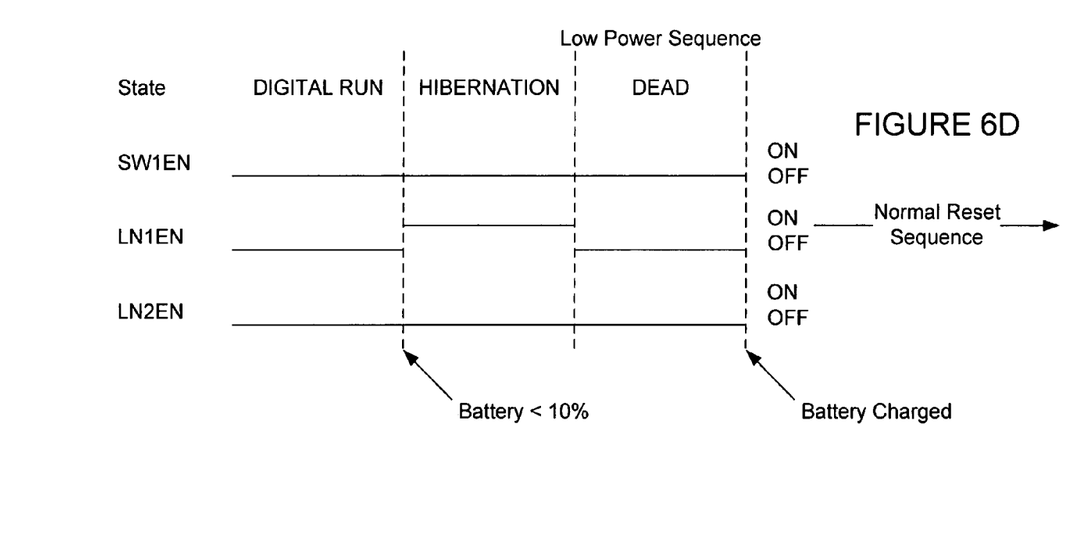

Referring now to FIG. 6D, a low-power sequence for the watch device 420 is shown. For this embodiment, the software transitions from its current state into the HIBERNATION state (block 510 of FIG. 5) when the battery charge falls to approximately 10%. During the HIBERNATION state, the primary switching regulator 406, SYSCLK, and the secondary linear regulator 410 are "off," while SLOWCLK and the primary linear regulator 408 are "on." In order to perform this transition, the software will save all possible states, disable SYSCLK and the display, enable the primary linear regulator 408, and disable the primary switching regulator 406 and the secondary linear regulator 410. An interrupt from the battery charger is normally used as the trigger for the software to exit the HIBERNATION state and return to the DIGITAL RUN state (block 504).

According to this embodiment, if the battery voltage goes below about 3V, the watch device 420 transitions to the DEAD state (block 512). During the DEAD state, SYSCLK and SLOWCLK stop and the contents of RAM will be destroyed since all regulators are disabled. The only way to exit the DEAD state is to charge the battery 414. When the battery voltage reaches about 3V, a hardware controlled transition to the RESET state will restart the SYSCLK and reset will be released (transition to the DIGITAL RUN state (block 504).

Another potentially critical area of power state management is battery shelf life. It is desirable for the watch device to arrive in a customer's hands with some power remaining in the battery. Since the total time that a device spends in the retail channel may exceed 6 months, a special OFF mode may be included as part of the power state transition graph. This allows the power consumption of the device to drop to below about 54 uW so that the total battery life in this state could exceed about 416 days. While not capable of normal operation in this state, the watch device can be powered up by an end user so that they can enjoy the device instantly without waiting for hours to charge the device.

Lastly, in an effort to reduce production costs, the power state transition hardware also allows for the removal of the power on reset circuitry that is typically found in a computer system of this type. This power on reset circuitry would add to the cost and the component count of the watch if the feature were not included as part of the power state transition hardware.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for regulating power consumption of a portable low-power computer device having associated hardware and software by regulating an internal power source of the device, comprising:
   (a) activating the device by applying an internal power supply voltage from the internal power source to the device;
   (b) regulating the power supply voltage based on a first power state of the device by using at least one of a plurality of voltage regulators to regulate the power supply voltage of the internal power source;
   (c) transitioning from the first power state to a second power state;
   (d) regulating the power supply voltage based on the second power state of the device by using at least one of the plurality of voltage regulators to regulate the power supply voltage of the internal power source;
   (e) determining an amount of power remaining in the internal power source;
   (f) enabling a system clock having an operating frequency in megahertz to a drive a processing section of a microprocessor of the device; and
   (g) generating a slow clock having an operating frequency in kilohertz to drive a real-time section of the microprocessor of the device, wherein the processing section of the microprocessor is disabled when the real-time section is enabled.

2. The method for regulating power in the device as in claim 1, wherein (b) further comprises using a switching regulator to regulate the internal power supply voltage when the first power state is a DIGITAL RUN, IDLE, or RESET state.

3. The method for regulating power in the device as in claim 2, further comprising:
   driving the real-time clock sections of the microprocessor with the slow clock when the first power state is an IDLE state.

4. The method for regulating power in the device as in claim 1, wherein (b) further comprises using at least one linear regulator to regulate the internal power supply voltage when the first power state is a RADIO RUN or HIBERNATION state.

5. The method for regulating power in the device as in claim 4, further comprising:
   (h) disabling the system clock when the first power state is a RADIO RUN or HIBERNATION state; and
   (i) driving the real-time clock sections of the microprocessor when the first power state is a RADIO RUN or HIBERNATION state.

6. The method for regulating power in the device as in claim 1, wherein (b) further comprises using a first linear regulator and a second linear regulator to regulate the internal power supply voltage when the first power state is a RADIO RUN state.

7. The method for regulating power in the device as in claim 1, wherein (c) further comprises activating a RESET sequence when a user of the device manipulates a chord.

8. A method of regulating power of a portable electronic device having a radio, microprocessor, software, and an internal power supply, comprising:
   determining a power state of the device, wherein the power state corresponds to a radio state when the radio is enabled for receiving signals, and wherein the power state corresponds to a non-radio state when the radio is disabled from receiving signals;
   disabling the processing section of the microprocessor if the power state of the device is a first state;
   enabling the processing section of the microprocessor when the power state of the device is a second state;
   enabling a real-time section of the microprocessor when the power state of the device is the first state;
   maintaining power to the microprocessor with either a switching regulator or a linear regulator;
   selecting the switching regulator for the internal power supply when the power state of the device corresponds to the first state; and
   selecting the linear regulator for the internal power supply when the power state of the device corresponds to the second state.

9. A device for receiving, navigating, and displaying content, comprising:
   an internal power supply having a power supply voltage;
   a microprocessor that is operated from the power supply voltage, wherein the microprocessor includes a real-time section that is operated with a slow clock and a processing section that is operated with a system clock;
   a radio having transmitting and receiving operability;
   software applications;
   a display;
   a power regulation system utilizing one or more device power states and configured to disable the processing section of the microprocessor while also enabling the real-time section of the microprocessor when the power state of the device is a radio state and to enable the processing section of the microprocessor when the power state is not a radio state or another select power state; and
   a user interface.

10. The device of claim 9 wherein the power regulation system further comprises a switching regulator for regulating the power supply during a first power state of the device; and,
    at least one linear regulator for regulating the power supply during a second power state of the device.

11. The device of claim 10, further configured to enable the switching regulator to regulate the internal power supply voltage when the first power state is a DIGITAL RUN, IDLE, or RESET state.

12. The device of claim 10, further configured to disables the system clock of and to enable the slow clock having an operating frequency of about 25 kHz to drive real-time clock sections of the microprocessor when the first power state is an IDLE state.

13. The device of claim 10, further configured to enable the system clock having an operating frequency of about 27.6 MHz to drive the microprocessor and the slow clock having an operating frequency of about 25 kHz to drive real-time clock sections of the microprocessor when the first power state is a RESET or DIGITAL RUN state.

14. The device of claim 10, further configured to enable at least one linear regulator to regulate the internal power supply voltage when the first power state is a RADIO RUN or HIBERNATION state.

15. The device of claim 10, further configured to enable first and second linear regulators to regulate the internal power supply voltage when the first power state is a RADIO RUN state.

16. The device of claim 9, further comprising a plurality of buttons used to activate or disable the device, wherein at least two buttons define a chord.

17. The device of claim 16, further configured to activate a RESET sequence when a user of the device manipulates a chord.

18. A device for receiving, navigating, and displaying content, comprising:
- an internal power supply having a power supply voltage;
- a microprocessor including a real-time section that is responsive to a local clock that is operated in kilohertz and a processing section that is responsive to a system clock that is operated in megahertz;
- a radio having transmitting and receiving operability;
- a display;
- a means for regulating the internal power supply voltage of the device based on a power state of the device and configured to disable the processing section of the microprocessor if the power state of the device is a radio state and enable the processing section of the microprocessor when the power state is not a radio state or another select power state; and
- a user interface.

19. The device of claim 18, wherein the means for regulating the internal power supply is configured to enable a switching regulator to regulate the internal power supply voltage when the power state of the device is a DIGITAL RUN, IDLE, or RESET state.

20. The device of claim 18, wherein the means for regulating the internal power supply is configured to enable at least one linear regulator to regulate the internal power supply voltage when the power state of the device is a RADIO RUN or HIBERNATION state.

21. The device of claim 18, wherein the means for regulating the internal power supply is configured to disable a switching regulator, at least one linear regulator, and one or more device clocks when the power state of the device is a DEAD state.

22. The device of claim 18, further comprising a plurality of buttons used to activate or disable the device, wherein at least two buttons define a chord.

23. The device of claim 22, further configured to activate a RESET sequence when a user of the device manipulates a chord.

* * * * *